United States Patent [19]

Masuyama et al.

[11] Patent Number: 4,567,057
[45] Date of Patent: Jan. 28, 1986

[54] METHOD OF MAKING MAGNETIC RECORDING MEDIUM

[75] Inventors: Kenichi Masuyama; Toshimitu Okutu; Takahito Miyoshi; Hiroshi Ogawa; Masahiro Utumi; Masaaki Fujiyama; Sugihiko Tada, all of Kanagawa, Japan

[73] Assignee: Fuji Photo Film Co., Ltd., Kanagawa, Japan

[21] Appl. No.: 654,549

[22] Filed: Sep. 26, 1984

[30] Foreign Application Priority Data

Oct. 3, 1983 [JP] Japan ................................ 58-184827

[51] Int. Cl.$^4$ ............................................. H01F 10/02
[52] U.S. Cl. ...................................... 427/48; 427/130
[58] Field of Search ................................ 427/128–132, 427/48

[56] References Cited

U.S. PATENT DOCUMENTS 4,208,447  6/1980  Bate et al. .............................. 427/48

FOREIGN PATENT DOCUMENTS 1346992  2/1974  United Kingdom .................. 427/48

Primary Examiner—Bernard D. Pianalto
Attorney, Agent, or Firm—Murray, Whisenhunt & Ferguson

[57] ABSTRACT

A magnetic coating composition comprising a binder dissolved in a solvent and magnetic grains dispersed therein is applied onto a surface of a non-magnetic substrate continuously moved. The coating film thus overlaid on the non-magnetic substrate is subjected to a preliminary orientation step for orientating the magnetic grains in the coating film, and then to a preliminary drying step. A final orientation step is then conducted while intermediate drying is carried out. Thereafter, final drying is effected.

2 Claims, 4 Drawing Figures

F I G. 1
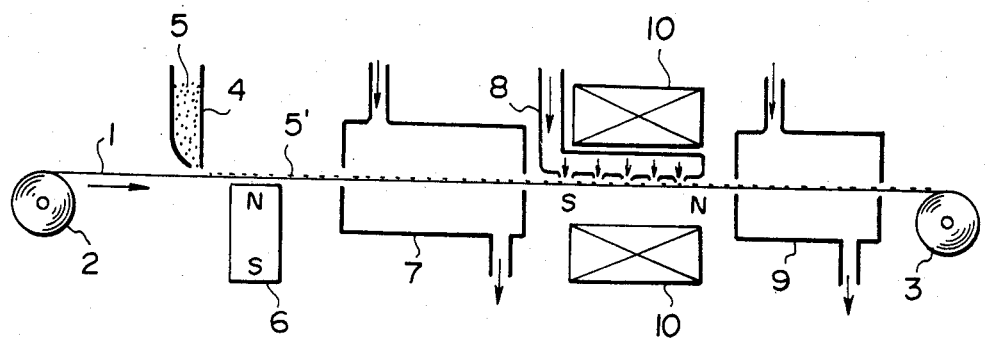
F I G. 2
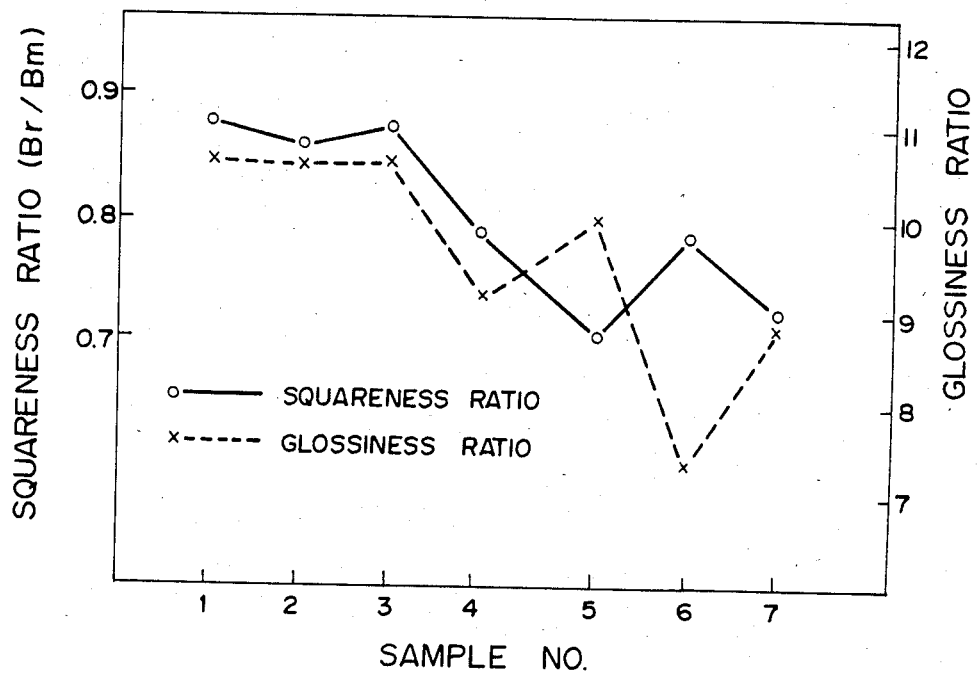

METHOD OF MAKING MAGNETIC RECORDING MEDIUM

BACKGROUND OF THE INVENTION

1. Field of the Invention

This invention relates to a method of making a magnetic recording medium. This invention particularly relates to a method of making a magnetic recording medium which exhibits excellent orientation of magnetic grains and excellent surface smoothness.

2. Description of the Prior Art

Recently, a strong need exists for improvement of the S/N ratio of magnetic recording media. In order to satisfy the need, various attempts have been made to improve the S/N ratio by decreasing the size of magnetic grains constituting magnetic layers of magnetic recording media or by improving the surface smoothness of magnetic layers.

As one type of generally used magnetic recording media, there has heretofore been known a magnetic recording medium comprising a non-magnetic substrate and a magnetic layer overlaid on the surface of the non-magnetic substrate by the application of a magnetic coating composition containing a binder dissolved in a solvent and magnetic grains dispersed therein. The magnetic recording medium of this type is made by continuously moving the non-magnetic substrate, by applying the magnetic coating composition onto the surface of the non-magnetic substrate, and by drying and hardening the coating film thus applied to form the magnetic layer. In order to improve the squareness of the magnetic hysteresis curve of the magnetic layer, an external magnetic field is applied to the coating film before it is hardened, thereby orientating the easily magnetizable axis of magnetic grains in a desired direction.

It is generally known that orientation of the magnetic grains orientated by the magnetic orientation processing tends to be disturbed before the coating film is dried. Experiments conducted by the inventors revealed that the tendency toward orientation disturbance increases as the grain size of the magnetic grains is decreased. Therefore, the extent to which the grain size of the magnetic grains can be decreased for the purpose of improving the S/N ratio as described above is limited.

Accordingly, in order to improve the S/N ratio, it becomes essential to improve the surface smoothness of the magnetic recording medium. However, the surface smoothness is also closely related to the orientation of the magnetic grains. That is, when a magnetic orientation processing is carried out for orientating the magnetic grains, the magnetic grains agglomerate and roughen the surface of the coating film to deteriorate the surface smoothness. In order to eliminate this problem, it has been proposed in Japanese Patent Publication No. 56(1981)-36496 to preliminarily dry the coating film to such an extent that the magnetic grains are not magnetically agglomerated by an orientation magnetic field and then to carry out an orientation processing and drying. However, with this method, it is not possible to sufficiently improve the orientation of the magnetic grains.

SUMMARY OF THE INVENTION

The primary object of the present invention is to provide a method of making a magnetic recording medium which exhibits excellent orientation of magnetic grains and a high squareness ratio.

Another object of the present invention is to provide a method of making a magnetic recording medium which exhibits excellent surface smoothness and an improved S/N ratio.

The present invention provides a method of making a magnetic recording medium by applying a magnetic coating composition, which comprises a binder dissolved in a solvent and magnetic grains dispersed therein, onto a surface of a non-magnetic substrate continuously moved, and by subjecting the coating film thus overlaid on the surface of said non-magnetic substrate to a magnetic orientation processing and a drying processing, wherein the improvement comprises the steps of: after said magnetic coating composition is applied onto the surface of said non-magnetic substrate, conducting preliminary orientation, conducting preliminary drying, conducting final orientation while intermediate drying is carried out, and then conducting final drying.

By the method of the present invention, it becomes possible to obtain a magnetic recording medium which exhibits excellent orientation of magnetic grains, a high squareness ratio, excellent surface smoothness, and an improved S/N ratio.

BRIEF DESCRIPTION OF THE DRAWINGS

FIG. 1 is a schematic view showing an apparatus for carrying out an embodiment of the method in accordance with the present invention, FIG. 2 is a graph showing the squareness ratio and the glossiness ratio of a magnetic recording medium made by the method of the present invention in comparison with those of a magnetic recording medium made by the conventional method.

DESCRIPTION OF THE PREFERRED EMBODIMENTS

Figure 3:
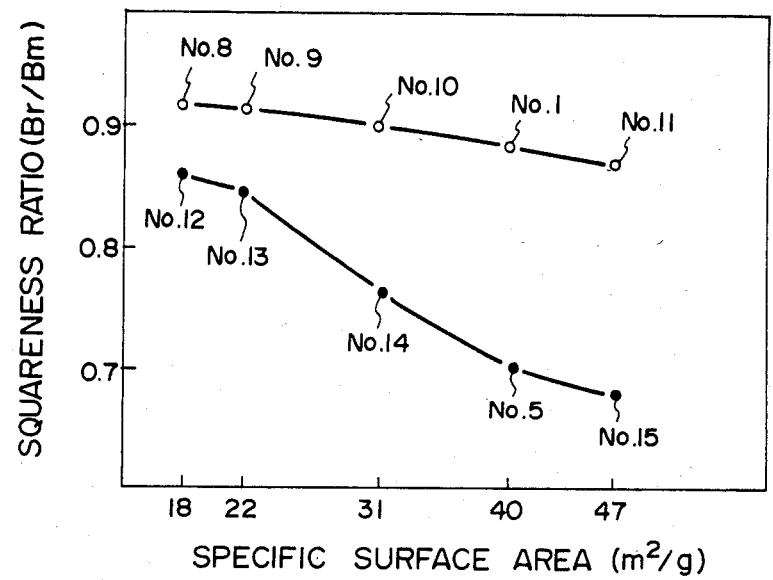
FIG. 3 is a graph showing the relationships between the squareness ratio and the specific surface area of magnetic grains in a magnetic recording medium made by the method of the present invention and that made by the conventional method.

The present invention will hereinbelow be described in further detail with reference to the accompanying drawings.

FIG. 1 shows an apparatus for carrying out an embodiment of the method of making a magnetic recording medium in accordance with the present invention. A long strip-like non-magnetic substrate 1 is continuously fed from a feed roll 2 and wound up around a wind-up roll 3. By way of example, a coating head 4 is positioned adjacent the surface (upper surface in FIG. 1) of the non-magnetic substrate 1 moved continuously, and a magnetic coating composition 5 is applied by the coating head 4 onto the surface of the non-magnetic substrate 1. The magnetic coating composition 5 comprises a binder dissolved in a solvent and magnetic grains dispersed therein. By the application of the magnetic coating composition 5, a coating film 5' is overlaid on the surface of the non-magnetic substrate 1.

A preliminary orientation magnet 6, a preliminary drying means 7, an intermediate drying means 8, and a final drying means 9 are positioned in this sequence on the side downstream from the coating head 4 in the moving direction of the non-magnetic substrate 1. Further, a final orientation magnet 10 is positioned outside of the intermediate drying means 8.

The non-magnetic substrate 1 is passed near the preliminary orientation magnet 6 while the coating film 5' overlaid thereon is wet. At this time, magnetic grains in the coating film 5' are orientated in a desired direction. As the preliminary orientation magnet 6, it is possible to use a single-pole permanent magnet, a double-pole opposed permanent magnet, a four-pole opposed permanent magnet, or an electromagnet. In general, the preliminary orientation magnet 6 should preferably exhibit a mean magnetic flux density within the range of 300 gauss to 5,000 gauss, more preferably within the range of 1,000 gauss to 4,000 gauss.

Thereafter, the non-magnetic substrate 1 is sent into the preliminary drying means 7 for feeding dry air onto the surface of the non-magnetic substrate 1. Thus the non-magnetic substrate 1 is preliminarily dried by the drying means 7 and is then passed under the intermediate drying means 8. While the non-magnetic substrate 1 is being dried by the intermediate drying means 8, it is subjected to a final orientation processing by the final orientation magnet 10. Then, the non-magnetic substrate 1 is subjected to final drying by the final drying means 9 to harden the coating film 5' overlaid on the non-magnetic substrate 1. In this manner, a magnetic tape comprising a magnetic layer constituted by the coating film 5' is obtained.

In the preliminary drying step, drying should preferably be effected to such an extent that the ratio of the solvent remaining in the coating film 5' is within the range of 50% to 95% of that in the magnetic coating composition 5 before it is applied onto the non-magnetic substrate 1. In the intermediate drying step, drying should preferably be effected to such an extent that the ratio of the residual solvent is within the range of 5% to 70% of that in the original magnetic coating composition 5. In the final drying step, the coating film 5' should preferably be dried to an extent such that the ratio of the residual solvent is less than 5% of that in the original magnetic coating composition 5. When the preliminary drying is effected beyond the aforesaid range, the viscosity of the coating film 5' increases and it becomes difficult to orientate the magnetic grains in the coating film 5' by the final orientation magnet 10. In this case, the squareness ratio of the magnetic recording medium obtained becomes low, and the electromagnetic transducing characteristics thereof are deteriorated. When the degree of the preliminary drying is below the aforesaid range, since the final orientation by the final orientation magnet 10 is carried out in the very low viscosity condition of the coating film 5', the magnetic grains in the coating film 5' readily agglomerate, and the surface smoothness and the S/N ratio of the magnetic recording medium obtained become low. Also, in this case, since the drying load in the preliminary drying step increases, it becomes necessary to increase the lengths of the intermediate drying means 8 and the final orientation magnet 10.

The non-magnetic substrate 1 may be made of, for example, a polyester such as polyethylene terephthalate or polyethylene-2,6-naphthalate; a polyolefin such as polyethylene or polypropylene; a cellulose derivative such as cellulose triacetate, cellulose diacetate, cellulose acetate butyrate or cellulose acetate propionate; a vinyl resin such as polyvinyl chloride or polyvinylidene chloride; or a plastic such as polycarbonate, polyimide or polyamide imide. According to the intended application, it is also possible to use a non-magnetic metal such as aluminium, copper, tin, zinc, or a non-magnetic alloy containing at least one of these metals; a ceramic material such as glass, earthenware or porcelain; paper, baryta paper, or paper coated or laminated with an α-polyolefin having 2 to 10 carbon atoms such as polyethylene, polypropylene or ethylene-butene copolymer. The non-magnetic substrate 1 may be transparent or opaque depending on the purpose of use.

The non-magnetic substrate 1 may be in the form of a film, a tape, a sheet, a disk, a card, a drum or the like, and various materials may be selected therefor according to the form thereof.

In the case where the non-magnetic substrate 1 is in the form of a film, a tape or a sheet, the thickness thereof is generally within the range of approximately 1 $\mu$m to 50 $\mu$m, preferably within the range of 1 $\mu$m to 30 $\mu$m. When the non-magnetic substrate 1 is in the form of a disk or a card, the thickness is generally within the range of approximately 0.5 mm to 10 mm. In the case where the non-magnetic substrate 1 is in the form of a cylindrical drum, the shape thereof is determined in accordance with the recorder in which it is used.

As the magnetic grains, it is possible to use ferromagnetic iron oxide, ferromagnetic chromium dioxide, and ferromagnetic alloy grains.

The ferromagnetic iron oxide which may be used as the ferromagnetic fine grains in the present invention is represented by the general formula $FeO_x$ where x is a value within the range of $1.33 \leq x \leq 1.50$. Examples of such ferromagnetic iron oxide are maghemite ($\gamma$-$Fe_2O_3$, x=1.50), magnetite ($Fe_3O_4$, x=1.33) and Berthollide compounds of these compounds ($FeO_x$, $1.33 < x < 1.50$). The value x is represented by the formula:

$$x = 1/200[2(\text{atomic \% of bivalent iron}) \div 3(\text{atomic \% of trivalent iron})]$$

The above-described ferromagnetic iron oxide may contain a bivalent metal such as Cr, Mn, Co, Ni, Cu or Zn in a proportion within the range of 0 to 10 atomic % based on the ferromagnetic iron oxide.

The ferromagnetic chromium dioxide ($CrO_2$) which may be used in the present invention may contain metals such as Na, K, Ti, V, Mn, Fe, Co, Ni, Tc, Ru, Sn, Ce and Pb, semiconductors such as P, Sb and Te, or oxides of these metals in a proportion within the range of 0 to 20 wt. %.

The above-mentioned ferromagnetic iron oxide and ferromagnetic chromium dioxide should generally have an acicular ratio within the range of about 2/1 to 20/1, preferably an acicular ratio of 5/1 or higher, and an average grain length within the range of 0.2 $\mu$m to 2.0 $\mu$m.

The ferromagnetic alloy grains which may be used as ferromagnetic fine grains in the present invention should have a metal content of 75 wt. % or more, of which 80 wt. % or more should be constituted by at least one ferromagnetic metal (i.e. Fe, Co, Ni, Fe-Co, Fe-Ni, Co-Ni or Co-Ni-Fe). At most 20 wt. % of the metal content, preferably 0.5 to 5 wt. % thereof, may be constituted by Al, Si, S, Sc, Ti, V, Cr, Mn, Cu, Zn, Y, Mo, Rh, Pd, Ag, Sn, Sb, Te, Ba, Ta, W, Re, Au, Hy, Pb, chloride, chloroform, ethylene chlorohydrin and dichlorobenzene, or the like.

Besides the method of using the coating head 4, the magnetic coating composition 5 may be applied onto the non-magnetic substrate 1 by such coating methods as, for example, air doctor coating, blade coating, air knife coating, squeeze coating, impregnation coating, reverse roll coating, transfer roll coating, gravure coating, kiss roll coating, and spin coating. These coating methods are described in detail, for example, in "Coating Kogaku" (Coating Engineering), pp. 253–277 (Mar. 20, 1971) published by Asakura Shoten (Japan).

In the case of a multi-layer magnetic recording medium, the magnetic coating composition 5 is applied onto the non-magnetic substrate 1 by one of the aforesaid coating methods and dried, and the coating and drying processes are repeated to overlay two or more magnetic layers by continuous coating operations. Also, two or more magnetic layers may be overlaid on the non-magnetic substrate 1 by a simultaneous multi-layer coating method as described, for example, in Japanese Unexamined Patent Publication Nos. 48(1973)-98803 (DT-OS No. 2,309,159) and 48(1973)-99233 (DT-AS No. 2,309,158).

The magnetic coating composition 5 is applied in such an amount that the thickness of the magnetic layer after it is dried is within the range of approximately 0.5 $\mu$m to approximately 6 $\mu$m. When two or more magnetic layers are overlaid, the total thickness thereof should be within this range. The thickness is determined in accordance with the application, shape, and specifications of the magnetic recording medium.

Before the coating film 5' is dried, the surface thereof may be smoothed by using a magnet smoother, a smoothing coil, a smoothing blade, a smoothing bracket, or the like. The smoothing methods are described, for example, in British Pat. No. 1,191,424, Japanese Patent Publication Nos. 47(1972)-38802 and 48(1973)-11336, and Japanese Unexamined Patent Publication Nos. 49(1974)-53631, 50(1975)-112005, and 51(1976)-77303.

When the surface of the coating film 5' is calendered after it is dried, there should preferably be used the supercalendering process in which the non-magnetic substrate 1 is passed between a pair of a metal roll and a cotton roll or a synthetic resin (e.g. nylon, polyurethane) roll, or between a pair of metal rolls. The supercalendering process should preferably be conducted at a roll pressure within the range of approximately 25 kg/cm to 500 kg/cm, at a temperature within the range of approximately 35° to 150° C., and at a processing speed within the range of approximately 5 m/min. to 200 m/min. Temperatures and roll pressures above the above-mentioned ranges adversely affect the magnetic layer and the non-magnetic substrate 1. Processing speeds below approximately 5 m/min. cannot provide the surface smoothing effect, and those above approximately 200 m/min. make it difficult to conduct the processing.

The surface smoothing processing is described, for example, in U.S. Pat. Nos. 2,688,567, 2,998,325 and 3,783,023, DT-OS No. 2,405,222, Japanese Unexamined Patent Publication Nos. 49(1974)-53631, 50(1975)-10337, 50(1975)-99506, 51(1976)-92606, 51(1976)-102049 and 51(1976)-103404, and Japanese Patent Publication No. 52(1977)-17404.

The present invention will further be illustrated by the following nonlimitative examples in which the apparatus as shown in FIG. 1 is used.

EXAMPLE 1

A magnetic coating composition 5 was prepared by mixing the materials as described below in a ball mill.

| | |
|---|---|
| Co—Fe$_2$O$_3$ (magnetic grains) | 100 parts |
| Coercive force (Hc): | 650 oersted, specific |
| surface area: | 40 m$^2$/g |
| Vinyl chloride-vinyl acetate copolymer (binder) Maleic acid content: 4%, 400X110A supplied by Nippon Zeon Co., Ltd. | 20 parts |
| Thermoplastic polyurethane (binder) N-2304 supplied by Nippon Polyurethane K.K. | 10 parts |
| Palmitic acid (lubricant) | 2 parts |
| Butyl stearate (lubricant) | 1 part |
| α-Al$_2$O$_3$ (abrasive material) | 5 parts |
| Grain size: | 0.2 $\mu$m |
| Methyl ethyl ketone (organic solvent) | 150 parts |
| Cyclohexanone (organic solvent) | 100 parts |
| Toluol (organic solvent) | 50 parts |

Onto the surface of a 15 $\mu$m-thick polyethylene terephthalate base (non-magnetic substrate 1), the magnetic coating composition 5 was applied so that the thickness of a coating film thus overlaid was 5 $\mu$m after it is dried. After final drying, a supercalendering process was conducted to obtain a magnetic tape. A solenoid exhibiting a mean magnetic flux density of 2,000 gauss was used as the final orientation magnet 10. The magnetic tape thus obtained was cut to a ½ inch width.

In this manner, magnetic tape sample Nos. 1, 2, and 3 were prepared respectively by using a single-pole permanent magnet, a double-pole permanent magnet, and a solenoid exhibiting a mean magnetic flux density of 1,600 gauss as the preliminary orientation magnet 6 in the apparatus of FIG. 1.

For comparison, sample No. 4 was prepared in the same manner as the preparation of sample No. 1, except that preliminary orientation by the preliminary orientation magnet 6 in FIG. 1 was not carried out. Sample No. 5 for comparison was prepared in the same manner as the preparation of sample No. 1, except that magnetic orientation was carried out once by using a solenoid in accordance with the conventional method and then drying was conducted once independently of the orientation step. Sample No. 6 for comparison was prepared in the same manner as the preparation of sample No. 1, except that preliminary orientation was conducted and then final orientation was carried out in a drying means as described, for example, in Japanese Unexamined Patent Publication No. 52(1977)-141612. Further, sample No. 7 was prepared in the same manner as the preparation of sample No. 1, except that preliminary drying and magnetic orientation were conducted in this order and then final drying was carried out as described, for example, in Japanese Patent Publication No. 56(1981)-36496.

The glossiness ratios and the squareness ratios (values obtained by dividing the residual magnetic flux density Br by the saturated magnetic flux density Bm) of magnetic tape sample Nos. 1 to 7 were measured. FIG. 2 shows the results of measurements. As clear from FIG. 2, the magnetic recording media (sample Nos. 1, 2 and 3) made by the method of the present invention exhibit a higher glossiness ratio and better surface smoothness than those of the magnetic recording media (sample Bi, La, Ce, Pr, Nd, B, P, or the like. The ferromagnetic alloy grains may also contain small amounts of water, hydroxides or oxides. Bundled magnetic grains as disclosed in Japanese Unexamined Patent Publication No. 57(1982)-124404 may also be used.

The binder contained in the magnetic coating composition used in the present invention may be a conventional thermoplastic resin, a thermosetting resin, or a reactive resin, or a mixture of two or more of these resins.

The thermoplastic resin which may be used as the binder in the present invention generally has a softening point of 150° C. or lower, an average molecular weight within the range of 10,000 to 200,000, and a polymerization degree within the range of about 200 to 2000. The thermoplastic resin may, for example, be a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a polyvinyl fluoride, a vinylidene chloride-acrylonitrile copolymer, a butadiene-acrylonitrile copolymer, a polyamide resin, a polyvinyl butyral, a cellulose derivative (such as cellulose acetate butyrate, cellulose diacetate, cellulose triacetate, cellulose propionate, or nitrocellulose), a styrene-butadiene copolymer, a polyester resin, a synthetic rubber type thermoplastic resin (such as polybutadiene, polychloroprene, polyisoprene, or styrene-butadiene copolymer), or a mixture of two or more of these compounds.

Examples of the thermoplastic resin of this type are described, for example, in Japanese Patent Publication Nos. 37(1962)-6877, 39(1964)-12528, 39(1964)-19282, 40(1965)-5349, 40(1965)-20907, 41(1966)-9463, 41(1966)-14059, 41(1966)-16985, 42(1967)-6428, 42(1967)-11621, 43(1968)-4623, 43(1968)-15206, 44(1969)-2889, 44(1969)-17947, 44(1969)-18232, 45(1970)-14020, 45(1970)-14500, 47(1972)-18573, 47(1972)-22063, 47(1972)-22064, 47(1972)-22068, 47(1972)-22069, 47(1972)-22070, and 48(1973)-27886; U.S. Pat. Nos. 3,144,352, 3,419,420, 3,499,789 and 3,713,887.

The thermosetting resin or the reactive resin which may be used as the binder in the present invention generally has a molecular weight of 200,000 or less when in the form of coating solution, and exhibits an infinite increase in the molecular weight through the condensation or addition reaction or the like when applied onto the substrate and dried. It is preferable that the resin of this type does not soften or melt before the thermal decomposition. Examples of the resin of this type are a phenol formaldehyde-novolak resin, a phenol formaldehyde-resol resin, a phenol furfural resin, a xylene formaldehyde resin, a urea resin, a melamine resin, a drying oil alkyd resin, an alkyd resin modified with phenolic resin, an alkyd resin modified with maleic resin, an unsaturated polyester resin, a combination of an epoxy resin with a hardener (e.g. polyamine, acid anhydride, polyamide resin or the like), a moisture hardening type terminal isocyanate polyester resin, a moisture hardening type terminal isocyanate polyether resin, a polyisocyanate prepolymer (e.g. a compound having three or more isocyanate groups per molecule and obtained by the reaction of diisocyanate and low molecular weight triol, a trimer or a tetramer of diisocyanate, or the like), a resin containing a polyisocyanate prepolymer and an active hydrogen (e.g. polyester polyol, polyether polyol, acrylic copolymer, maleic copolymer, 2-hydroxyethyl methacrylate copolymer, para-hydroxy styrene copolymer or the like), and a mixture of two or more of these compounds.

Examples of the thermosetting resin or the reactive resin of this type are described, for example, in Japanese Patent Publication Nos. 39(1964)-8103, 40(1965)-9779, 41(1966)-7192, 41(1966)-8016, 41(1966)-14275, 42(1967)-18179, 43(1968)-12081, 44(1969)-28023, 45(1970)-14501, 45(1970)-24902, 46(1971)-13103, 47(1972)-22065, 47(1972)-22066, 47(1972)-22067, 47(1972)-22072, 47(1972)-22073, 47(1972)-28045, 47(1972)-28048, and 47(1972)-28922; and U.S. Pat. Nos. 3,144,353, 3,320,090, 3,437,510, 3,597,273, 3,781,210 and 3,781,211.

The above-mentioned binders may be used alone or as a mixture of two or more thereof. The binders are used in the magnetic coating composition in a proportion within the range of 8 to 400 parts by weight, preferably 10 to 200 parts by weight, per 100 parts by weight of the ferromagnetic grains.

In addition to the binders and magnetic grains, additives such as dispersing agents, lubricants, abrasive materials, and antistatic agents may be added to the magnetic coating composition 5.

Among the vinyl chloride-vinyl acetate copolymers, those containing carboxyl group should preferably be used as the binder. The copolymers of this type are obtained by copolymerizing vinyl chloride, vinyl acetate and a polymerizable unsaturated carboxylic acid. As the polymerizable unsaturated carboxylic acid, it is possible to use maleic acid, acrylic acid, methacrylic acid, crotonic acid, isocrotonic acid, or the like.

The magnetic coating composition 5 is prepared by kneading the ferromagnetic grains, binder, dispersing agent, lubricant, abrasive material, antistatic agent, anticorrosive agent, antifungal agent and solvent.

When the magnetic coating composition 5 is prepared, the constituents thereof may be introduced into a kneader all at once or sequentially. For example, the magnetic grains may first be added to a solvent containing a dispersing agent, and kneaded for a predetermined length of time to form the magnetic coating composition 5.

It is possible to use various types of kneading machines for kneading the magnetic coating composition 5, for example, a twin roll mill, a triple roll mill, a ball mill, a pebble mill, a trommel, a sand grinder, a Szegvari attritor, a high-speed impeller dispersing machine, a high-speed stone mill, a high-speed impact mill, a disperser, a kneader, a high-speed mixer, a homogenizer, an ultrasonic dispersing machine or the like.

The kneading and dispersing techniques are described, for example, in "Paint Flow and Pigment Dispersion" by T. C. Patton, John Wiley & Sons, 1964, and U.S. Pat. Nos. 2,581,414 and 2,855,156.

The organic solvents used as the dispersing and coating solvents may, for example, be ketones such as acetone, methyl ethyl ketone, methyl isobutyl ketone and cyclohexanone; esters such as methyl acetate, ethyl acetate, butyl acetate, ethyl lactate and glycol acetate monoethyl ether; ethers such as ethyl ether, ethylene glycol dimethyl ether, ethylene glycol monoethyl ether and dioxane; aromatic hydrocarbons such as benzene, toluene and xylene; chlorinated hydrocarbons such as methylene chloride, ethylene chloride, carbon tetra- Nos. 4 to 7) made by the conventional method. Also, the magnetic recording media made by the method of the present invention exhibit excellent magnetic orientation and a very high squareness ratio (near 0.9) which could not be obtained by the conventional method.

EXAMPLE 2

Magnetic tape sample Nos. 8, 9, 10 and 11 were prepared in the same manner as the preparation of sample No. 1 in Example 1, except that the grain size and the coercive force of Co-γ-$Fe_2O_3$ were changed. Also, sample Nos. 12, 13, 14 and 15 for comparison were prepared in the same manner as the preparation of sample No. 5 for comparison in Example 1, except that the grain size and the coercive force of Co-γ-$Fe_2O_3$ were changed to the same values as those of sample Nos. 8, 9, 10 and 11, as shown in the table below. The grain size of the magnetic grains was adjusted in terms of the specific surface area ($m^2/g$).

| Sample No. | Specific surface area ($m^2/g$) | Coercive force (Oe: oersted) |
| --- | --- | --- |
| 8,12 | 18 | 660 |
| 9,13 | 21 | 640 |
| 10,14 | 31 | 670 |
| 11,15 | 47 | 680 |
| 1,5 | 41 | 650 |

Figure 4:
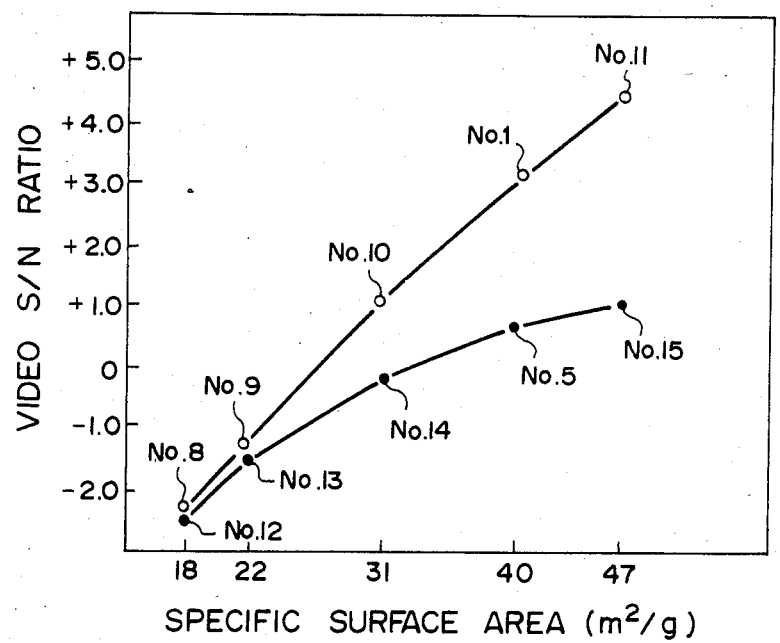
FIG. 4 is a graph showing the relationships between the video S/N ratio and the specific surface area of magnetic grains in a magnetic recording medium made by the method of the present invention and that made by the conventional method.

The squareness ratios (Br/Bm) and the video S/N ratios of the aforesaid samples were measured. FIGS. 3 and 4 show the results of measurements.

As shown in FIG. 3, there is the tendency for the orientated condition to be disturbed as the grain size of the magnetic grains is decreased, i.e. as the specific surface area thereof is increased. However, the degree of decrease of the squareness ratio (Br/Bm) as the grain size of the magnetic grains is decreased in the magnetic recording media (sample Nos. 1 and 8 to 11) made by the method of the present invention is lower than that in the magnetic recording media (sample Nos. 5 and 12 to 15) made by the conventional method. Thus the magnetic recording media made by the method of the present invention exhibit less tendency for the orientated condition to be disturbed.

Also, as shown in FIG. 4, the extent of improvement in the S/N ratio achieved by decreasing the grain size of the magnetic grains and by enhancing the surface smoothness in the magnetic recording media made by the method of the present invention is markedly higher than that in the magnetic recording media made by the conventional method.

By the conventional methods, it was not always possible to achieve orientation of the magnetic grains when the magnetic coating composition in which a vinyl chloridevinyl acetate copolymer containing maleic acid was used as the binder was used. However, in the method of the present invention, it is possible to orientate the magnetic grains sufficiently even when the binder of this type is used.

We claim:

1. A method of making a magnetic recording medium by applying a magnetic coating composition, which comprises a binder dissolved in a solvent and magnetic grains dispersed therein, onto a surface of a non-magnetic substrate continuously moved, and by subjecting a coating film thus overlaid on the surface of said non-magnetic substrate to a magnetic orientation processing and a drying processing, wherein the improvement comprises the steps of: after said magnetic coating composition is applied onto the surface of said non-magnetic substrate, conducting preliminary orientation by use of a magnetic field generation means exhibiting a means magnetic flux density with the range of 300 gauss to 5,000 gauss, conducting preliminary drying to such an extent that the ratio of a solvent remaining in a coating film overlaid on said non-magnetic substrate is within the range of 50% to 95% of the ratio thereof in the original magnetic coating composition, conducting final orientation while intermediate drying is carried out to such an extent that the ratio of a solvent remaining in a coating film overlaid on said non-magnetic substrate is within the range of 5% to 70% of the ratio thereof in the original magnetic coating composition, and then conducting final drying to such an extent that the ratio of a solvent remaining in a coating film overlaid on said non-magnetic substrate is less than 5% of the ratio thereof in the original magnetic coating composition.

2. A method as defined in claim 1 wherein said preliminary orientation is conducted by use of a magnetic field generation means exhibiting a mean magnetic flux density within the range of 1,000 gauss to 4,000 gauss.

* * * * *